United States Patent Office 2,959,590
Patented Nov. 8, 1960

2,959,590

PIPERAZINE PHOSPHONIC ACID COMPOUNDS

Rodney D. Moss, Midland, Mich., assignor to The Dow Chemical Company, Midland, Mich., a corporation of Delaware No Drawing. Filed Oct. 13, 1958, Ser. No. 766,710

3 Claims. (Cl. 260—268)

This invention is concerned with piperazine phosphonic acids, their esters and salts. More particularly it is concerned with a phosphonic acid compound having the formula

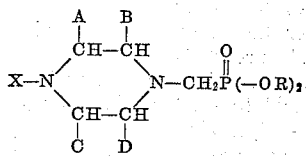

and its hydrohalide salts. In this and succeeding formulae, A, B, C and D are independently hydrogen or methyl; R is hydrogen or a lower alkyl radical containing from 1 to 4 carbon atoms, inclusive; X is methyl or

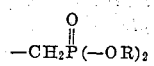

By "hydrohalide" is meant hydrochloride or hydrobromide.

The products of this invention are light colored liquids or white or light colored crystalline solids soluble in polar solvents such as ethanol and isopropanol, and of low solubility in solvents such as kerosene, petroleum ether and xylene. The hydrohalide salts are also soluble in aqueous alkali.

The compounds are useful as parasiticides and as herbicides. The piperazine phosphonic acid compounds which are esters having the structure

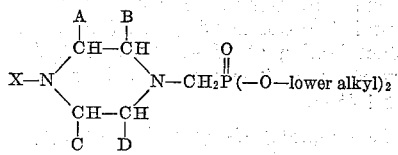

may be prepared by mixing together a piperazine having the structure

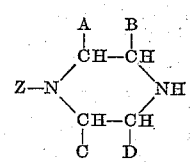

wherein Z is hydrogen or methyl, a hydrogen dialkyl phosphite having the structure

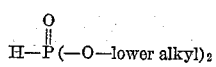

and formaldehyde. Water is a by-product in this reaction.

The piperazine phosphonic acid compounds which are free acids may be prepared by hydrolyzing the ester compounds above prepared. When the hydrolysis is carried out with hydrohalic acid, a monohydrohalide addition salt of the phosphonic acid is obtained. The free phosphonic acid may be obtained by contacting an aqueous solution of the hydrohalide addition salt with a strong anion exchange resin.

The hydrohalide salt of the ester may be obtained by the addition of an equimolar amount of hydrogen halide to the ester.

In the preparation of the ester good results are obtained when stoichiometric amounts of the reactants are employed. "Stoichiometric amount" is based on the piperazine compound employed as starting material. Thus, when the reactant piperazine compound has the structure

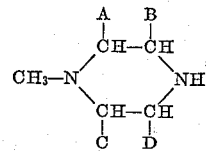

substantially equimolar amounts of piperazine, formaldehyde and phosphite ester are employed, whereas when the piperazine compound has the structure

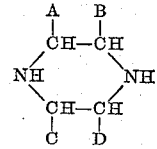

about two molar proportions of formaldehyde and phosphite ester are employed for each molar proportion of piperazine. The reaction takes place in the temperature range of from 20° C. to 100° C. with the formation of the desired ester product and water by-product. The latter is conveniently removed from the reaction mixture azeotropically by codistilling with a nonpolar solvent such as cyclohexane, benzene, xylene, ethylcyclohexane and toluene. The ester product is recovered as residue and may be purified, if desired, by distillation.

The acid may be prepared by heating the ester in aqueous medium in the presence of an acidic or basic catalyst. The hydrolysis of the ester is most conveniently carried out by refluxing the ester with aqueous hydrohalic acid whereupon a monohydrohalide addition salt of the phosphonic acid precipitates from the reaction mixture on cooling. The free acid may be prepared, if desired, by mixing an aqueous solution of the hydrohalide addition salt with a strong anion exchange resin.

In the preferred method for preparing the esters, formaldehyde is added with stirring to a mixture of the appropriate piperazine compound and dialkyl hydrogen phosphite. An exothermic reaction takes place with the formation of the desired phosphonic acid ester and water of reaction. An azeotroping solvent is then added to the reaction mixture and the mixture heated to codistill the water with the azeotroping solvent and to distill any low boiling material. The desired ester is recovered as residue. The latter may be purified, if desired, by fractional distillation. The acid salt of the ester may be prepared, if desired, by adding hydrohalic acid thereto and recovering the product as a solid.

In the preferred method for preparing the acids, the ester prepared as above described is heated at reflux temperature with excess aqueous hydrohalic acid for a period of from about 1 to 8 hours. The reaction mixture is then allowed to cool whereupon the monohydrohalide addition salt of the phosphonic acid precipitates as a crystalline solid. The latter is recovered by filtration. The free acid may be prepared, if desired, by adding an equivalent amount of aqueous alkali and recovering the solid acid by conventional procedures.

The following examples illustrate the invention but are not to be construed as limiting.

Example 1.—Tetraethyl (1,4-piperazinylenedimethylene)-diphosphonate

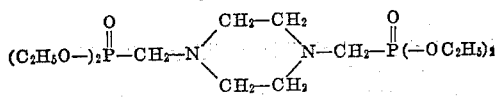

81 grams (1.0 mole) of aqueous 37 percent formaldehyde was added with stirring to a mixture of 29.5 grams (0.34 mole) of piperazine and 138 grams (1.0 mole) of diethyl hydrogen phosphite over a period of about 10 minutes. An exothermic reaction took place with the formation of tetraethyl (1,4-piperazinylenedimethylene)-diphosphonate and water by-product. After the evolution of heat had ceased 150 milliliters of ethylcyclohexane was added to the mixture and the mixture heated to codistill the water with ethylcyclohexane, to distill off unreacted diethyl hydrogen phosphite and to recover the tetraethyl (1,4-piperazinylenedimethylene)diphosphonate product as a viscous liquid residue. The latter has a molecular weight of 386.4.

Example 2.—(1,4-piperazinylenedimethylene)diphosphonic acid·hydrobromide

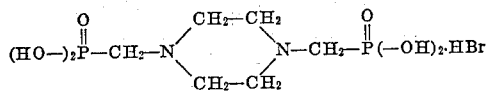

The ester prepared in Example 1 was heated under reflux for 8 hours with 250 milliliters of 48 percent hydrobromic acid. After completion of the heating the mixture was cooled to 10° C. to precipitate the (1,4-piperazinylenedimethylene)diphosphonic acid·hydrobromide product as a white crystalline solid. The latter after recovering by filtration, washing with water and drying, melted at 278°–280° C. with decomposition. The product had elemental analyses (percent) as follows:

|  | C | H | P | N | Br |
|---|---|---|---|---|---|
| Calculated | 20.3 | 4.8 | 17.45 | 7.88 | 22.5 |
| Found | 20.57 | 4.76 | 16.29 | 7.72 | 23.2 |

Example 3.—Tetraethyl trans-(2,5-dimethyl-1,4-piperazinylenedimethylene)diphosphonate

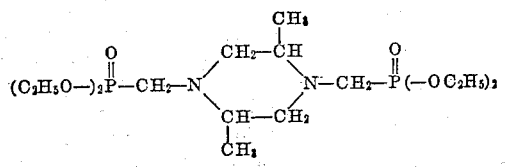

122 grams (0.5 mole) of 37 percent aqueous formaldehyde was added with stirring over a 40 minute period to a mixture of 57 grams (0.5 mole) of trans-2,5-dimethylpiperazine and 207 grams (1.05 moles) of diethyl hydrogen phosphite while the temperature was maintained between 25° and 88° C. A reaction took place with the formation of tetraethyl trans-(2,5-dimethyl-1,4-piperazinylenedimethylene)diphosphonate and water by-product. Thereafter, 150 milliliters of ethylcyclohexane was added thereto and the mixture heated to co-distill the water by-product with ethylcyclohexane. The remaining mixture was then heated under reduced pressure to distill the solvent and any low boiling impurities and to recover the ester product as residue. Tetraethyl trans-(2,5-dimethyl-1,4-piperazinylenedimethylene)diphosphonate has a molecular weight of 414.4.

Example 4.—Trans-(2,5-dimethyl-1,4-piperazinylenedimethylene)diphosphonic acid·hydrobromide The ester prepared in Example 3 was heated for 1 hour with 240 milliliters of 48 percent hydrobromic acid. Thereafter, the mixture was cooled to precipitate the trans-(2,5-dimethyl-1,4-piperazinylene)diphosphonic acid·hydrobromide product as a white crystalline solid. The latter after washing with water and ethanol melted at 278°–281° C. with decomposition. The yield of the product based on the piperazine employed was 114 grams or 99 percent of theory. The product had a bromine content of 20.7 percent. The theoretical value is 20.9 percent.

Example 5

In a similar manner, 30 grams (1.0 mole) of paraformaldehyde was added portionwise with stirring over a period of 25 minutes to a mixture of 38 grams (0.3 mole) of cis and trans-2,6-dimethylpiperazine and 138 grams (1.0 mole) of diethyl hydrogen phosphite while the mixture was maintained at a temperature in the range of from 60° to 70° C. Stirring was continued over a period of 45 minutes while the temperature was gradually increased to 95° C. to complete the reaction to produce the tetraethyl cis and trans-(2,6-dimethyl-1,4-piperazinylenedimethylene)diphosphonate product and water of reaction. Thereafter, about 100 milliliters of toluene was added to the mixture and the mixture heated to codistill the water with the toluene. The mixture was then heated at reduced pressure to remove the low boiling material and to recover the ester product having a molecular weight of 414.4 as residue.

The ester was heated under reflux with excess aqueous hydrobromic acid to produce the cis and trans-(2,6-dimethyl-1,4-piperazinylenedimethylene) diphosphonic acid·hydrobromide product as a tan colored solid having a molecular weight of 383.3. The product had a bromine content of 19.6 percent. The theoretical value is 20.87 percent.

Example 6.—Diethyl (4-methyl-1-piperazinyl)methyl phosphonate

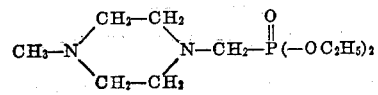

In a manner similar to that previously described, 50 grams (0.5 mole) of 1-methylpiperazine, 18 grams (0.6 mole) of paraformaldehyde and 82.8 grams (0.6 mole) of diethyl hydrogen phosphite were reacted for 3 hours at a temperature range of from 26° to 80° C. to obtain the desired diethyl (4-methyl-1-piperazinyl)methyl phosphonate product and water by-product. About 75 milliliters of ethylcyclohexane were added thereto to codistill the water and thereafter the remaining mixture was fractionally distilled to obtain 56 grams (45 percent) of the ester product boiling at 87°–89° C. at 0.07 millimeter of mercury pressure. The product had a refractive index, $n_D^{25\ °C.}$ of 1.4586.

Example 7.—(4-methyl-1-piperazinyl)methylphosphonic acid·hydrobromide 25 grams (0.1 mole) of the ester prepared in Example 6 was heated under reflux with 100 milliliters of 48 percent hydrobromic acid for 2 hours. The mixture was added to 750 milliliters of absolute ethanol to precipitate (4-methyl-1-piperazinyl)methylphosphonic acid·hydrobromide product in a yield of 22.3 grams. The product had a melting point of 243°–244° C. and a bromine content of 29.4 percent. The theoretical value is 29.1 percent.

Example 8

A dilute aqueous solution of (4-methyl-1-piperazinyl)-methylphosphonic acid·hydrobromide is passed through a column of quaternary ammonium anion exchange resin (in the hydroxide form) and the effluent solution evaporated to dryness to obtain (4-methyl-1-piperazinyl)-methylphosphonic acid as residue. The latter has a molecular weight of 275.1.

Example 9

Diethyl (4-methyl-1-piperazinyl)methyl phosphonate·hydrobromide is prepared by passing an equivalent proportion of gaseous hydrogen bromide to an ethereal solution of diethyl (4-methyl-1-piperazinyl)methyl phosphonate prepared as described in Example 6. The ester hydrobromide product precipitates in the reaction mixture and is recovered by filtration. The product has a molecular weight of 331.2.

*Example 10*

In an operation similar to that described in Example 1, tetra(normal-butyl) (1,4-piperazinylenedimethylene) diphosphonate having a molecular weight of 498.6 is prepared from 1 molar proportion of formaldehyde, 0.5 molar proportion of piperazine and 1 molar proportion of di(normal-butyl) hydrogen phosphite.

The phosphonic acid compounds having the structure

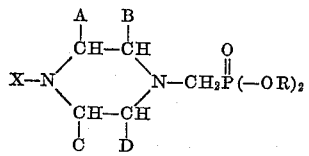

and their hydrohalide salts are useful as parasiticides, adapted to be employed for the control of such undesirable species such as *Aerobacter aerogenes, Erwinia carotovora, Salmonella typhosa, Staphylococcus aureus, Penicillium digitatum, Alternaria solani, Fusarium oxysporum lycopersici,* Cooperia sp., Trichostrongylus sp., *Haemonchus contortus, Ostertagia ostertagia,* Esophogostum sp., and Bunostatum sp.

In a representative operation as a parasiticide, complete controls of the bacterial organisms, *Aerobacter aerogenes, Erwinia carotovora, Salmonella typhosa* and *Staphylococcus aureus* were obtained when in separate operations, nutrient agar media saturated with (1,4-piperazinylenedimethylene)diphosphonic acid·hydrobromide were streaked with the above organisms and incubated at 30° C. for 3 days.

The phosphonic acid compounds and their hydrohalide salts are also useful as herbicides adapted to be employed for the growth of seeds, weeds and foliage of undesirable plant species such as *Brassica napus, Phalaris canariensis* and *Salvinia rotundifolia.*

In a representative operation as a herbicide, substantially complete control of the germination and growth of rape seed (*Brassica napus*) was obtained when beds seeded with rape was treated with an aqueous dispersion containing 100 parts by weight of tetraethyl trans-(2,5-dimethyl - 1,4 - piperazinylenedimethylene)diphosphonate and observed after 11 days.

I claim:

1. A compound selected from the group consisting of (a) a phosphonic acid compound having the structure

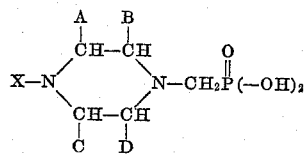

wherein A, B, C and D are independently selected from the group consisting of hydrogen and methyl; and X is selected from the group consisting of methyl and

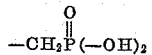

and (b) hydrohalide salts of said phosphonic acid compound.

2. (1,4-piperazinylenedimethylene)diphosphonic acid·hydrobromide.

3. (4-methyl-1-piperazinyl)methylphosphonic acid·hydrobromide.

References Cited in the file of this patent
UNITED STATES PATENTS
2,706,194  Morris et al. _____ Apr. 12, 1955